(12) United States Patent
Zhou et al.

(10) Patent No.: US 10,566,606 B2
(45) Date of Patent: Feb. 18, 2020

(54) SPHERICAL OR SPHERICAL-LIKE CATHODE MATERIAL FOR A LITHIUM BATTERY, A BATTERY AND PREPARATION METHOD AND APPLICATION THEREOF

(71) Applicant: Guizhou Zhenhua E-Chem Inc., Guiyang (CN)

(72) Inventors: Chaoyi Zhou, Guiyang (CN); Lijuan Wang, Guiyang (CN); Zhu'an Yin, Guiyang (CN); Daixiang Yang, Guiyang (CN); Qianxin Xiang, Guiyang (CN); Ming Mei, Guiyang (CN); Peng Peng, Guiyang (CN)

(73) Assignee: Guizhou Zhenhua E-CHEM Inc., Guiyang (CN)

( * ) Notice: Subject to any disclaimer, the term of this patent is extended or adjusted under 35 U.S.C. 154(b) by 0 days.

(21) Appl. No.: 15/602,311

(22) Filed: May 23, 2017

(65) Prior Publication Data

US 2018/0175368 A1    Jun. 21, 2018

(30) Foreign Application Priority Data

Dec. 16, 2016 (CN) .......................... 2016 1 1168653

(51) Int. Cl.
*H01M 4/00*   (2006.01)
*H01M 4/131*  (2010.01)
(Continued)

(52) U.S. Cl.
CPC ............ *H01M 4/131* (2013.01); *C01G 53/50* (2013.01); *H01M 4/505* (2013.01); *H01M 4/525* (2013.01);
(Continued)

(58) Field of Classification Search
CPC .. H01M 4/525; H01M 10/0525; H01M 4/366; C01P 2002/20; C01G 53/50
See application file for complete search history.

(56) References Cited

U.S. PATENT DOCUMENTS

| 2012/0045690 A1 | 2/2012 | Xiang et al. |
| 2015/0093641 A1 | 4/2015 | Mitsumoto et al. |
| 2016/0156020 A1* | 6/2016 | Tokoro ................. C01G 53/50 252/182.1 |

FOREIGN PATENT DOCUMENTS

| CN | 102077397 A | 5/2011 |
| CN | 102077397 A | 5/2011 |

(Continued)

OTHER PUBLICATIONS

EP Search Report dated Nov. 7, 2017 in EP 17175190.2.
(Continued)

*Primary Examiner* — Cynthia H Kelly
*Assistant Examiner* — Monique M Wills
(74) *Attorney, Agent, or Firm* — Lathrop Gage LLP (57) ABSTRACT

The present invention discloses a spherical or spherical-like lithium battery cathode material, a battery and preparation methods and applications thereof. The chemical formula of the cathode material is: $Li_aNi_xCo_yMn_zM_bO_2$, wherein $1.0 \leq a \leq 1.2$; $0.0 < b \leq 0.05$; $0.30 \leq x \leq 0.90$; $0.05 \leq y \leq 0.40$; $0.05 \leq z \leq 0.50$; $x+y+z+b=1$; M is one or two or more of Mg, Ti, Al, Zr, Y, Co, Mn, Ni, Ba and a rare earth element. A single $\alpha$-$NaFeO_2$ type layered structure of the cathode material is shown by a powder X-ray diffraction pattern and full width at half maximum FWHM (110) of the (110) diffraction peak near a diffraction angle $2\theta$ of 64.9° is in the range of 0.073 to 0.145; the morphology of the cathode material is spherical or spherical-like primary particles and a small amount of secondary particles; the cumulative percentage of the number of particles having a particle (Continued)

diameter of 5 μm or less is usually larger than 60% in the number-basis particle sizes of primary particles and secondary particles agglomerated by primary particles of the cathode material. The cathode material in the present invention has excellent circulating performance, storage performance and safety performance under high temperature and high voltage, and is suitable for digital product, electric vehicle, electric bicycle, fast charging bus, passenger car, communication product, electric power and energy storage system etc.

13 Claims, 6 Drawing Sheets

(51) Int. Cl.
*H01M 4/525* (2010.01)
*C01G 53/00* (2006.01)
*H01M 4/505* (2010.01)
*H01M 4/36* (2006.01)
*H01M 10/0525* (2010.01)

(52) U.S. Cl.
CPC ...... *C01P 2002/20* (2013.01); *C01P 2002/50* (2013.01); *C01P 2002/70* (2013.01); *C01P 2002/72* (2013.01); *C01P 2004/03* (2013.01); *C01P 2004/32* (2013.01); *C01P 2004/50* (2013.01); *C01P 2004/51* (2013.01); *C01P 2004/61* (2013.01); *C01P 2004/62* (2013.01); *C01P 2006/12* (2013.01); *C01P 2006/40* (2013.01); *H01M 4/366* (2013.01); *H01M 10/0525* (2013.01); *H01M 2220/20* (2013.01); *Y02E 60/122* (2013.01); *Y02T 10/7011* (2013.01)

(56) References Cited

FOREIGN PATENT DOCUMENTS

| | | |
|---|---|---|
| CN | 102379053 A | 3/2012 |
| CN | 102394293 A | 3/2012 |
| CN | 102394293 A | 3/2012 |
| CN | 102509784 A | 6/2012 |
| CN | 102509784 A | 6/2012 |
| CN | 102714313 A | 10/2012 |
| CN | 103765658 A | 4/2014 |
| CN | 104966833 A | 10/2015 |
| CN | 104966833 A | 10/2015 |
| CN | 105958062 A | 9/2016 |
| EP | 2202828 A1 | 6/2010 |
| EP | 2264815 A1 | 12/2010 |
| EP | 2523240 A1 | 11/2012 |
| JP | 2009081130 A | 4/2000 |
| JP | 2005053764 | 3/2005 |
| JP | 2005053764 A | 3/2005 |
| JP | 2012023015 A | 2/2012 |
| JP | 2013501316 A | 1/2013 |
| KR | 10-2010-0112539 | 10/2010 |
| KR | 1020100112539 A | 10/2010 |
| KR | 10-2014-0018981 | 2/2014 |
| KR | 1020140018981 A | 2/2014 |
| WO | WO 2011075921 A1 | 6/2011 |

OTHER PUBLICATIONS

Chinese Patent Application No. 201611168653.6, Office Action dated Jul. 30, 2018, 9 pages.
Japanese Patent Application No. 2017-155475, Office Action dated Sep. 27, 2018, 11 pages.
Korean Patent Application No. 10-2017-0072220, Office Action dated May 14, 2018, 51 pages.
Korean Patent Application No. 10-2017-0072220, Office Action dated Nov. 21, 2018, 44 pages.

* cited by examiner

SPHERICAL OR SPHERICAL-LIKE CATHODE MATERIAL FOR A LITHIUM BATTERY, A BATTERY AND PREPARATION METHOD AND APPLICATION THEREOF

RELATED APPLICATIONS

This application claims priority to CN 201611168653.6, filed Dec. 16, 2016, the contents of which are incorporated herein by reference.

FIELD OF THE INVENTION

The invention belongs to a technical field of lithium ion battery, and relates to a lithium ion battery cathode material of a spherical or spherical-like layered structure, preparation methods thereof and a secondary lithium ion battery made of the cathode material.

BACKGROUND OF THE INVENTION

Nickel-cobalt-manganese (NCM) ternary materials have advantages of high specific capacity, low cost and good thermal stability etc., therefore, they have a very broad application prospect in the field of energy storage and electric vehicle. However, poor cycling performance is an important factor affecting the application of NCM ternary materials for a long time. The main transition elements are Ni, Co and Mn in NCM ternary materials, in which NCM ternary materials with different properties can be obtained with different ratios of the three elements. When contacting with an electrolytic solution, the stability of the material also changes due to the different ratios of elements. The factors affecting the cycle life of the ternary materials are: 1. Reconstruction of the surface crystal structure during the cycling process; 2. Secondary particles rupture due to the volume expansion of the anisotropy during the cycling process. It was found that the connecting structure between particle and particle in the secondary particles could cause localized current density to rise, which caused great stress and therefore affected the cycling performance of the material. At the same time, there was a phenomenon of inconsistency of charge state between various parts of particles, which would affect the electrochemical performance of an electrode.

In addition, when the amount of lithium deintercalation is larger, the structure of NCM ternary materials becomes very fragile, and a displacement of active metal and oxygen occurs in the crystal lattice, and when under a certain high temperature and high pressure, atomic rearrangement gradually increases, volume and phase of crystalline grain change largely. On the other hand, chemical and electrochemical reactions of the ternary materials with the electrolyte cause the material easy to deoxidation and the transition metal dissolved, especially the electrolyte in the high-voltage will be oxidized to produce H+ and the acidity of the electrolyte are improved. So a surface film of the electrode material is damaged by HF, and a composition and structure of the interface are further changed, seriously affecting the electrochemical performance and cycling performance of the material.

In order to solve the above-mentioned problems, NCM ternary materials are modified by bulk doping and surface coating modification, which is an effective method. The bulk doping of NCM ternary materials can effectively restrain the structure change, enhance the reversibility of materials and restrain the increase of the charge transfer impedance during the cycling process. The surface coating modification of NCM ternary materials can effectively avoid direct contact of the materials with the electrolyte, especially with HF in the electrolyte, thus prevent the occurrence of side reactions, inhibit crystal phase changes of the materials, thereby improve cycling stability and multiplication of the materials etc.

It was reported in Chinese invention patent of Application No. 200780013946.X, Publication No. CN101427403A, entitled "Positive Electrode Active Material Powder" that, the positive electrode active material powder of this invention comprised primary particles and aggregated particles by primary particles, and the average particle diameter on volume basis of the primary particles and the aggregated particles by the primary particles is 0.1 μm to 3 μm, and the percentage of the sum of the volume of particles having a particle diameter of 5 μm or more to the sum of the volume of all the particles is below 10%, and a BET specific surface area of the powder is more than 2 $m^2/g$ and less than 7 $m^2/g$. It was reported in Chinese invention patent of Application No. 200780013765.7, Publication No. CN101421867A, entitled "Positive Electrode Powder and Cathode Mixture" that, the positive electrode powder of this invention contains a positive electrode active material powder and a graphite powder, wherein the positive electrode active material powder contains primary particles and aggregated particles by primary particles, and more than 90% of the particles have a particle diameter of 0.1 μm to 5 μm, and a BET specific surface area of the powder is 1 $m^2/g$ to 7 $m^2/g$. It was reported in Chinese invention patent of Application No. 200780004424.3, Publication No. CN101379637A, entitled "A lithium transition metal compound powder of cathode material for lithium secondary battery and preparation methods thereof, a spray-dried body and calcined precursor thereof, a positive electrode for a lithium secondary battery and a lithium secondary battery using the lithium transition metal compound powder" that, the lithium-nickel-manganese-cobalt based composite oxide powder of cathode material for lithium secondary battery in this patent has a half width of the (110) diffraction peak in the vicinity of a diffraction angle 2θ of 64.5° of between 0.01 and 0.2 in the powder X-ray diffraction.

SUMMARY OF THE INVENTION

Aiming at the defect in the prior art that the cathode material structure is prone to fragmentation, which can cause contact of the material with the electrolytic solution to cause a side reaction to affect the cycling performance of the battery, the present invention aims to provide lithium ion battery cathode material of a spherical or spherical-like layered structure, and the material has an integrity structure, a good processing performance, without cases of particle fragmentation in the cycling process, effectively prevent direct contact of the surface of material with the electrolytic solution, especially contact with HF in the electrolytic solution, thus prevent occurrence of side reactions, stabilize the crystal structure of the material, and can effectively improve the battery cycling performance under high temperature and high voltage, especially stability under high temperature and safety performance when applied to the lithium-ion battery, especially the power lithium-ion battery.

Specifically, the present invention provides a lithium ion battery cathode material of a spherical or spherical-like layered structure, wherein the cathode material has a chemical formula:

$Li_aNi_xCo_yMn_zM_bO_2$, wherein $1.0 \leq A \leq 1.2$; $0.0 < b \leq 0.05$; $0.30 \leq x \leq 0.90$; $0.05 \leq y \leq 0.40$; $0.05 \leq z \leq 0.50$; $x+y+z+b=1$; and M is one or more of Mg, Ti, Al, Zr, Y, Co, Mn, Ni, Ba and a rare earth element.

Preferably, the cathode material powder comprises primary particles of a morphology of spherical or spherical-like shape and a small amount of secondary particles agglomerated by primary particles under scanning electron microscope (SEM), wherein cumulative percentage of the number of particles having a particle diameter of 5 μm or less is generally greater than 60% in the number-basis sizes of primary particles and secondary particles agglomerated by primary particles of the cathode material.

In the present invention, the particle size of the cathode material powder is determined by the particle size distribution of the laser diffraction scattering method, and the cumulative distribution is obtained by the frequency distribution accumulation.

Preferably, a doping amount b of the doping element M is 0.001 to 0.5, and also preferably 0.002 to 0.03.

Preferably, a single α-NaFeO$_2$ type layered structure of the cathode material is shown by the powder X-ray diffraction spectrum (XRD).

Preferably, full width at half maximum FWHM (110) of the (110) diffraction peak near a diffraction angel 2θ of 64.9° is 0.073 to 0.145 in the powder X-ray diffraction spectrum (XRD) of the cathode material.

Preferably, the lithium ion battery cathode material of a spherical or spherical-like layered structure is characterized in that a specific surface area measured by BET method is 0.3 to 0.9 m$^2$/g.

Preferably, the lithium ion battery cathode material of a spherical or spherical-like layered structure is characterized in that a median particle diameter of the cathode material is 3.0 to 8.0 μm, preferably a particle median diameter of 4.0 to 7.0 μm.

The present invention also aims to provide a preparation method for a lithium-nickel-cobalt-manganese-oxygen cathode material of a spherical or spherical-like layered structure, comprising at least the following steps:

mixing a lithium source, a M source and a nickel-cobalt-manganese precursor in a following molar ratio of Li, M and (Ni+Co+Mn), respectively a is 1.0 to 1.2, $0.0<b\leq0.05$, Ni+Co+Mn is 0.95 to 1.0, and sintering the obtained mixture at 800 to 1000° C. (preferably sintering the mixture for 4 to 30 hours), and cooling, and pulverizing and classifying to obtain a lithium ion battery cathode material of a spherical or spherical-like layered structure.

The present invention also aims to provide a preparation method for a lithium-nickel-cobalt-manganese-oxygen cathode material of a spherical or spherical-like layered structure, comprising at least the following steps:

dispersing a lithium source into a polyethylene glycol or an acrylamide aqueous colloid to prepare a colloid, and adding nickel-cobalt-manganese precursor according to a molar ratio of Li:(Ni+Co+Mn)=(1.0-1.2):(0.95-1.0) into the colloid to obtain a mixed material, and pre-sintering the mixed material at 400 to 800° C. and then sintering at 800 to 980° C., and cooling, and pre-pulverizing and classifying to obtain a lithium-nickel-cobalt-manganese-oxygen cathode material intermediate A, adding a solution of M source or a dispersion B into A to obtain a mixture C, and post-sintering the mixture C at 500 to 960° C., and cooling, and pulverizing and classifying to obtain a lithium ion battery cathode material of a spherical or spherical-like layered structure.

Preferably, wherein, said pre-sintering is carried out for 4 to 8 hours, and said sintering is carried out for 8 to 20 hours, and said post-sintering is carried out for 4 to 10 hours.

Preferably, wherein, a pressure of said pre-pulverizing is 0.1 to 1.0 MPa, preferably 0.3 to 0.4 MPa, and a pressure of said pulverizing is 0.1 to 0.8 MPa, preferably 0.4 to 0.7 MPa.

Preferably, the above-mentioned preparation method of the cathode material is characterized in that a median particle diameter D50 of the nickel-cobalt-manganese precursor is 3 to 12 μm, preferably 4 to 10 μm.

Preferably, the above-mentioned preparation method of the cathode material, wherein the lithium source used is one or two or more mixture of lithium carbonate, lithium hydroxide monohydrate, lithium nitrate and lithium acetate.

Preferably, the above-mentioned preparation method of the cathode material, wherein, the preparation method of the cathode material is characterized in that the nickel-cobalt-manganese precursor used is one or more of the group consisting of nickel-cobalt-manganese hydroxide, nickel-cobalt-manganese carboxyl oxide, and nickel-cobalt-manganese oxide.

Preferably, a method of adding the M source includes, but is not limited to, one or two or more of mechanical mixing, co-precipitation, and emulsification etc.

Preferably, the M source is an oxide of one or two or more selected from the group consisting of Mg, Al, Ti, Zr, Y, Co, Ni, Mn, Ba and a rare earth element, or a salt thereof or an organic compound thereof, and includes but is not limited to, acetic acid salt, sulfate, hydroxyl compound or ester compound etc., preferably ester compound, more preferably selected from tetrabutyl zirconate, or a mixture of cobalt hydroxide and nickel hydroxide.

The present invention also provides a lithium ion battery, which is characterized by comprising at least one of the cathode material of the present invention or the cathode material obtained by the preparation method of the present invention as a positive electrode active material.

Wherein, preferably, a circulation capacity retention ratio of the lithium ion battery is more than 90%.

The present invention also provides a lithium ion battery cathode material obtained by any one of the preceding preparation methods.

Wherein, when the cathode material of the present invention as a positive electrode active material is used for preparing a positive electrode of lithium ion battery, the positive electrode of the battery contains less than or equal to 10% by weight, preferably less than or equal to 8% by weight, more preferably 3 to 5% by weight of conductive carbon black, in addition to the positive electrode active material.

The present invention also provides a communication, an electric power, an energy storage system or a mobile storage device, which is characterized in that it is prepared by using the lithium ion battery described above.

The present invention also provides a use of a lithium ion battery as a power source for communication, power or energy storage system, mobile storage device, or electric vehicle.

The present invention also provides a use of the lithium ion battery in a mobile digital product (3C), an electric vehicle (xEV), an electric bicycle, a fast charge bus or a passenger car.

A cobalt-nickel-manganese precursor, a M-source and a lithium source are mixed, sintered and pulverized to prepare a cathode material by the present invention. A single α-NaFeO$_2$ type layered structure of the cathode material is shown by the powder X-ray diffraction spectrum (XRD) and full width at half maximum FWHM(110) of the (110) diffraction peak near the diffraction angle 2θ of 64.9° is generally 0.073 to 0.145. The morphology of the cathode material is shown as primary particle of spherical or spherical-like shape and a small amount of secondary particles agglomerated by primary particles under the scanning electron microscope (SEM). The cumulative percentage of the number of particles having a particle diameter of 5 μm or less is generally larger than 60% in the number-basis sizes of primary particles and secondary particles agglomerated by primary particles of the cathode material; the cumulative percentage of the volume of particles having a particle diameter of 5 μm or less is generally greater than 25% in the volume sizes of primary particles and secondary particles agglomerated by primary particles of the cathode material.

The cathode material provided by the present invention has excellent cycling performance, storage performance and safety performance under high temperature and high voltage, and is suitable for digital product, electric vehicle, electric bicycle, fast charge bus, passenger car, communication, electric power and energy storage system etc.

Compared with nickel-cobalt-manganese ternary cathode materials mainly based on the secondary aggregated particles, the lithium ion battery cathode material of spherical or spherical-like layered structure mainly based on primary particles of the present invention can effectively avoid the occurrence of secondary aggregated particle fragmentation, the cathode material has excellent cycling performance and safety performance under high temperature and high voltage, and is suitable for digital product, electric vehicle, electric bicycle, fast charging bus, passenger cars, communication, electricity, energy storage systems etc.

The preparation method of the present invention is simple, the preparation process is easy to control and operate, and the production cost is low.

EMBODIMENT

The present invention will now be described in more detail by way of specific examples, with reference to the accompanying drawings.

A preparation method of a lithium ion battery cathode material of a spherical or spherical-like layered structure of the present invention is prepared by one of two methods comprising the following steps:

Method 1: mixing a lithium source, a M source and a nickel-cobalt-manganese precursor (D50: 3-12 μm) according to a molar ratio of Li:M:(Ni+Co+Mn)=(1.0-1.2):(0-0.05, but not includes 0):(0.95 to 1.0), and heating the mixture from room temperature at a heating rate of 15.0 to 25.0° C./min, and sintering at 800 to 1000° C. for 4 to 30 hours, and cooling, and pulverizing and classifying to obtain a lithium ion battery cathode material of a spherical or spherical-like layered structure.

Method 2: dispersing a lithium source into a polyethylene glycol or an acrylamide aqueous colloid to make a colloid, then adding a nickel-cobalt-manganese precursor according to a molar ratio of Li:(Ni+Co+Mn)=(1.0-1.2):(0.95-1.0) to the colloid to obtain a mixture, and heating the mixture from room temperature at a heating rate of 15.0 to 25.0° C./min, and pre-sintering at 400 to 800° C. for 4 to 8 hours, and heating the mixture at a heating rate of (15.0 to 25.0) ° Cl min and sintering at 800-980° C. for 8-20 hours, and cooling, and pre-pulverizing and classifying to obtain a lithium-nickel-cobalt-manganese-oxygen cathode material intermediate A, and adding a solution of M source or a dispersion B into A to obtain a mixture C, wherein compare to 1.0 to 1.2 molar of lithium source, the adding amount of M source is greater than zero and less than or equal to 0.05 molar. Heating the mixture C at a heating rate of 15.0 to 25.0° C./min, and sintering at a temperature of 500 to 960° C. for 4 to 10 hours, and cooling, and pulverizing and classifying to obtain a lithium ion battery cathode material of a spherical or spherical-like layered structure.

Wherein, in the above-mentioned method 2, the mass concentration of the polyethylene glycol or the acrylamide aqueous colloid used as raw materials when dispersing are preferably as follows: the mass concentration of polyethylene glycol in the polyethylene glycol aqueous colloid is preferably 1 to 3%, the mass concentration of the acrylamide aqueous colloid is preferably 2 to 5%.

In a preferable embodiment of the present invention, the present invention also provides a lithium ion battery cathode material of spherical or spherical-like layered structure, which is characterized in that a chemical formula of the cathode material is $Li_aNi_xCo_yMn_zM_bO_2$, wherein $1.0 \leq a \leq 1.2$; $0.0 < b \leq 0.05$; $0.30 \leq x \leq 0.90$; $0.05 \leq y \leq 0.40$; $0.05 \leq z \leq 0.50$; $x+y+z+b=1$; M is one or more of Mg, Ti, Al, Zr, Y, Co, Mn, Ni, Ba and a rare earth element.

Wherein, the cathode material powder comprises primary particles of a morphology of spherical or spherical-like and a small amount of secondary particles agglomerated by primary particles under scanning electron microscope (SEM), wherein the cumulative percentage of the number of particles having a particle diameter of 5 μm or less is generally greater than 60% in the number-basis sizes of primary particles and secondary particles agglomerated by primary particles of the cathode material.

In the case where the cathode material of the present invention is used for preparing a positive electrode, a cathode material of the present invention used as a positive electrode active material is coated on a positive electrode current collector to prepare and obtain a positive electrode together with a conventional adhesive agent and a conventional conductive additive and so on. For example, carbon black is preferred as a conventional conductive additive. For example, polyvinylidene fluoride (PVDF) is preferred as a conventional adhesive agent. The amount of the carbon black added is usually not more than 10%, preferably not more than 8%, more preferably between 3% and 5% of the total cathode material. However, the positive electrode active material powder recorded in the Chinese Patent of Application No. 200780013765.7 and Publication No. CN101421867A is required to be disclosed in Chinese Patent Publication No. CN101421867A is required to be mixed with a larger amount of graphite powder (content: 5% to 20% by weight). What's more, the discharge capacity of the positive electrode of the patent prepared by the powder used for positive electrode at 1C is up to 143 mAh/g (condition of 4.3-3.0 V), which is much smaller than the average discharge capacity in the present invention of about 160-175 mAh/g (condition of 4.35-3.0 V) (the average discharge capacity of the present invention is about 155-171 mAh/g under 4.3-3.0 V), and the capacitance value of the present invention can be up to 202 mAh/g. This may be mainly due to the fact that the cathode material prepared by the present invention has a stronger stability, a moderate specific surface area, a complete material structure and a good processability, and does not cause particle fragmentation during the cycling process, and thus the battery prepared by the cathode material of the present invention has an excellent circulation capacity retention ratio.

The technical solution of the present invention will be described in further detail with reference to specific examples.

Example

The sintering equipment used in the examples: muffle furnace of Yixing Qianjin Furnace Industry Equipment Co., Ltd.

Pulverizing equipment: SHQM Type of Dual Planetary Ball Mill of Lian yungang Chunlong Experimental Instrument Co., Ltd; Airflow Pulverizing: MX-50 Airflow Pulverizer of Yixing Juneng Pulverizing Equipment Company. The pressure of airflow pulverizing in the following Examples 1-7 of the present invention is 0.1-1.0 MPa.

Analytical Instruments: MSU2000 Laser Particle Size Analyzer of British Malvern, SSA-3500 automatic specific surface analyzer produced and sold by Beijing Bi'ao Electronic Technology Co., Ltd; Supra55 sapphire field emission scanning electron microscope of Germany Zeiss, with a magnification of 5000 times by the microscope; X'pert PRU X-ray diffractometer of Netherlands Panne with a target of Cukα, a wavelength of 1.54 Å, a test voltage of 40 kV, a test current of 40 mA and a step of 0.013°; LIP-3AHB06 high temperature formation system of Zhejiang Hangke; CT2001C Test Equipment of Wuhan LAND electronics; KP-BAK-03E-02 efficient vacuum oven of Kerui Electrical, Dongguan City.

The secondary lithium ion battery of the present invention is composed of an electrode, a non-aqueous electrolyte, a separator and a container. Specifically, the electrode includes a positive electrode and a negative electrode, and the positive electrode is made of a material including a positive electrode current collector and a positive electrode active material coated on the positive electrode current collector with a conventional adhesive and a conventional conductive additive or the like, and the positive electrode active material is the lithium ion battery cathode material of primary spherical or spherical-like of the present invention. The negative electrode is made of a material including collector and a conventional negative electrode active material coated on the collector with a conventional adhesive and a conventional conductive additive or the like. The separator is a PP/PE film conventionally used in the industry for separating the positive and negative electrodes from each other; the container is a containing object of a positive electrode, a negative electrode, a separator, and an electrolyte.

In the following examples, the specific method of manufacturing the secondary lithium ion button cell with the lithium ion battery cathode material of spherical or spherical-like layered structure prepared by the present invention is shown as follows:

Positive electrode preparation: the lithium ion battery cathode material of spherical or spherical-like layered structure of the present invention, a conductive carbon black (SP) and an adhesive of polyvinylidene fluoride (PVDF) were added into N-Methylpyrrolidone (NMP) (a weight ratio of lithium-nickel-cobalt-manganese cathode material to NMP is 2.1:1) in a weight ratio of 90:5:5 and the mixture was mixed thoroughly, and stirred to form a uniform slurry, and coated on the aluminum foil collector, and dried and pressed into pole pieces. The pressed positive pole piece was punched, weighed and baked, and then was assembled into battery in a vacuum glove box. Put the bottom shell of the button cell firstly, and foamed nickel (2.5 mm) and negative lithium metal sheet (produced by Tianjin, 99.9%) were put on the top of the bottom shell, 0.5 g electrolytic solution was injected in the condition of relative humidity of less than 1.5% using a mixed solvent of EC, DEC, and DMC with a mass ratio of EC:DEC:DMC=1:1:1, the electrolyte was 1M hexafluorophosphate, putted the separator and the positive electrode, and then covered the button cell cover and sealed the battery. The model of the button cell is CR2430.

In the following examples, the method of preparing the secondary lithium ion battery by the lithium ion battery cathode material of the spherical or spherical-like layered structure prepared by the present invention is shown as follows:

Positive cathode preparation: The lithium ion battery cathode material of the spherical or spherical-like layered structure of the present invention, conductive carbon black (SP) and an adhesive of polyvinylidene fluoride (PVDF) were added into N-Methylpyrrolidone (NMP) (a weight ratio of lithium-nickel-cobalt-manganese cathode material to NMP is 2.1:1) in a weight ratio of 94:3:3, the mixture was mixed thoroughly, stirred to form a uniform slurry, coated on the aluminum foil collector, dried and pressed to form an electrode.

Negative electrode preparation: negative artificial graphite, conductive carbon black (S.P), carboxymethyl cellulose (CMC) and an adhesive (SBR) at a weight ratio of 95:1:1:3 were added into a sufficient amount of pure water, and the mixture was mixed and stirred to form a uniform slurry, coated on a copper foil collector, dried and pressed to form an electrode.

The separator is PP/PE composite film material. Lug was spotted weld to the pressed positive and negative electrode, the separator was inserted, the materials were rolled in the winding machine and then put into the soft package fixture, and then sealed the top and side of the soft package, and then baked in the oven, and then 9 g of electrolytic solution was injected in the condition of relative humidity of less than 1.5% using a mixed solvent of DE, DEC, and DMC with a mass ratio of EC:DEC:DMC=1:1:1, the electrolyte was 1M lithium hexafluorophosphate. After injection and formation for 48 hours, the soft package was vacuumized and sealed. The battery model is 454261.

The charging and discharging test of the secondary lithium ion experiment battery prepared by the present invention was tested on the Wuhan LAND electronics battery tester according to the test method of GB/T18287-2000.

Source of reagent used in the Examples is given as table A:

| Reagent name | Grade | Model | Manufacturer |
|---|---|---|---|
| cobalt sulfate heptahydrate | Industrial grade | 98 wt % | Nanjing Chemical Reagent Factory |
| nickel sulfate hexahydrate | Industrial grade | 98 wt % | Nanjing Chemical Reagent Factory |
| manganese sulfate monohydrate | Industrial grade | 98 wt % | Nanjing Chemical Reagent Factory |
| zirconium nitrate pentahydrate | Industrial grade | 97 wt % | Nanjing Chemical Reagent Factory |
| yttrium nitrate hexahydrate | Industrial grade | 95 wt % | Nanjing Chemical Reagent Factory |
| manganese acetate | battery grade | 99.50% | Dalian First Organic Chemical Co., Ltd |
| cobalt acetate | battery grade | 99.50% | Hubei Xingyinhe Chemical Raw Material Co, Ltd |
| nickel acetate | battery grade | 99.50% | Tongyuan Chemical Industry |
| nickel-cobalt-manganese carboxyl oxide | Composite of manganese acetate, cobalt acetate, and nickel acetate | — | Guizhou Zhenhua E-CHEM Co., Ltd |
| nano magnesium oxide | ceramic grade | — | Anhui Xuancheng Jingrui New Material Co., Ltd |
| nano yttrium oxide | ceramic grade | — | Anhui Xuancheng Jingrui New Material Co., Ltd |
| nano zirconium oxide | ceramic grade | — | Anhui Xuancheng Jingrui New Material Co., Ltd |
| tungsten oxide | ceramic grade | — | Anhui Xuancheng Jingrui New Material Co., Ltd |
| tetra-n-butyl titanate | reagent grade | 99.80% | Nanjing Chemical Reagent Factory |
| tetrabutyl zirconate | reagent grade | 99.80% | Nanjing Chemical Reagent Factory |
| nano aluminium oxide(nano $Al_2O_3$) | ceramic grade | — | Anhui Xuancheng Jingrui New Material Co., Ltd |
| lithium hydroxide monohydrate | battery grade | 99.5 wt % | Jiangxi Ganfeng Lithium Co., Ltd |
| lithium carbonate | battery grade | 99.5 wt % | Jiangxi Ganfeng Lithium Co., Ltd |
| lithium nitrate | battery grade | 99.5 wt % | Shanghai Oujin Industrial Co., Ltd |
| lithium acetate | battery grade | 99.5 wt % | Sichuan Guoli Lithium material Co., Ltd |
| high purity oxygen | industrial grade | 99.95% pure | Shenzhen Nanshan gas station |
| conductive carbon black | battery grade | Super P Li | Swiss TIMCAL Company |
| N-methylpyrrolidone | battery grade | 99.5% of content | Jiangsu Nanjing Jinlong Chemical Plant |
| polyvinylidene difluoride | battery grade | Solef 6020 | Solvaychemical company of America |
| aluminium foil | battery grade | 16 μm thick | Alcoa Inc., AA |
| electronic tape | electronic grade | a green width of 10 mm | 3M Company of America |
| lithium sheet | electronic grade | a diameter ϕ of 20 mm, purity ≥ 99.9% | Shanghai Shunyou Metal Material Co., Ltd |
| electrolytic solution | electronic grade | LIB301, propylene carbonate (PC):ethylene carbonate(EC):diethyl carbonate(DEC) = 1:1:1(volume ratio), concentration of lithium salt LiPF6: 1 mol/L | Shenzhen Capchem Company |
| seperator | — | three layer material of PP/PE/PP, Celgard M825, thickness of 16 μm, | Celgard Company of America |
| aluminum film | industrial grade | a total thickness of 160 μm | DNP Company of Japan |

Example 1

1.04 mol of lithium hydroxide monohydrate was dispersed into 600 ml of acrylamide aqueous colloid having a mass concentration of 5%, the mixture was made to be a colloid at a rotation speed of 55 rpm for 90 min, and the carboxyl oxide (D50: 3 μm) of nickel-cobalt-manganese precursor having a molar ratio of Ni:Co:Mn=5:2:3 was added to the colloid at a molar ratio of Li:(Ni+Co+Mn)=1.04:0.998, and a mixed material was obtained at a rotation speed of 2000 rpm for 30 minutes, and the mixed material was put in a muffle furnace and heated at a rate of 15° C./min to 800° C. to be pre-sintered for 4 hours in an air atmosphere, and cooled to room temperature, then heated at a rate of 17° C./min to 980° C. to be sintered for 8 hours in an air atmosphere, and cooled to room temperature, then air pre-pulverized in an air pressure of 1.0 Mpa to get a cathode material intermediate A of lithium-nickel-cobalt-manganese-oxygen for stand-by. 0.002 mol of tetrabutyl titanate was added to 0.2 mol of isopropanol and the mixture was stirred for 10 min to obtain a solution B containing element titanium for stand-by. The organic solution B was added to the cathode material intermediate A of lithium-nickel-cobalt-manganese and the mixture was stirred for 30 min to obtain a mixture C. The mixture C was put in a muffle furnace and heated in an air atmosphere at a heating rate of 15° C./min to 960° C. to be sintered (Hereinafter referred to as "post-sintering", the following experiments are the same) for 4 hours, and cooled to room temperature, and air pulverized at a pressure of 0.7 MPa, and classified by a 300-mesh metal mesh to obtain a lithium ion battery cathode material D1 of spherical or spherical-like layered structure.

Figure 1A:
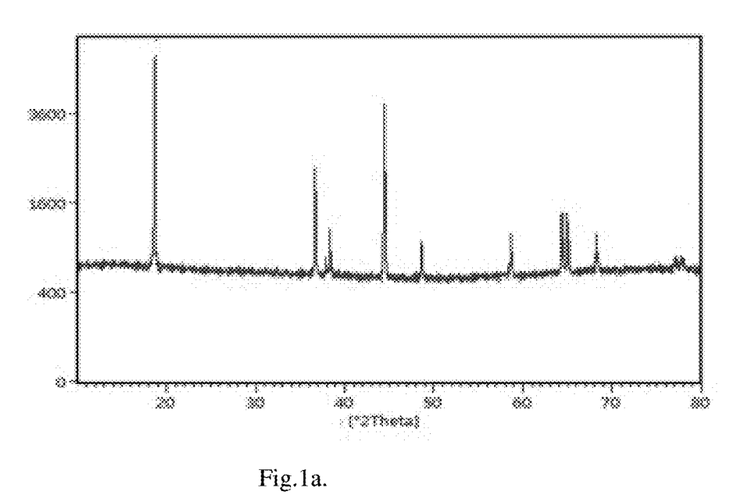
FIG. 1a. is a powder X-ray diffraction pattern (XRD) of the lithium ion battery cathode material D1 of a spherical or spherical-like layered structure prepared in Example 1.

The cathode material D1 powder was measured by the X-ray diffraction pattern, as shown in FIG. 1a. The test results showed that full width at half maximum FWHM (110) of the (110) diffraction peak at diffraction angle 2θ of 64.92 was 0.073, and the structure of the cathode material was a single α-NaFeO$_2$ type layered structure.

Figure 1B:
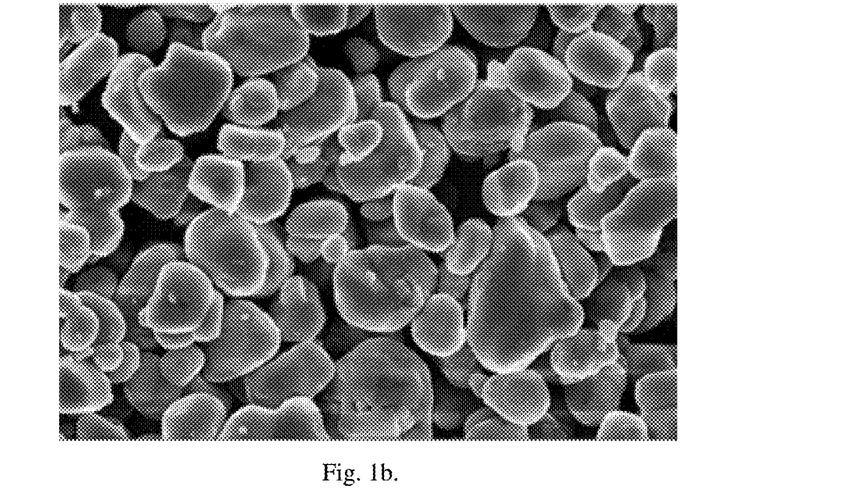
FIG. 1b. is a scanning electron micrograph (SEM) of the lithium ion battery cathode material D1 of a spherical or spherical-like layered structure prepared in Example 1.

The cathode material D1 powder was subjected to a scanning electron microscope test, as shown in FIG. 1b. The cathode material D1 powder mainly included the primary particles of a morphology of spherical or spherical-like and a small amount of secondary particles agglomerated by primary particles.

The cathode material D1 powder was subjected to particle size and specific surface area tests, the D50 was 3.0 μm, the cumulative percentage of the number of particles having a particle diameter of 5 μm or less was 94.4%, the cumulative percentage of the volume of the particles having a particle diameter of 5 μm or less was 63.5%, and the BET specific surface was 0.90 m$^2$/g.

Specifically, the corresponding conditions (sintering temperature, sintering time, airflow pulverizing pressure, M source and product) in the sintering step of the cathode material D1 are summarized in Table 1, as shown in Table 1. The index data of the cathode material D1 (the diffraction angle of the (110) plane of the X-ray diffraction, the half-width of the crystal plane, the cumulative percentages of number and the volume basis of the particle size of 5 μm or less; D50 and BET) are summarized in Table 2. The test results of the battery performance preparing by powder D1 as the active material of the cathode material are shown in Table 3.

Example 2

1.0 mol of lithium hydroxide monohydrate was dispersed into 650 ml of polyethylene glycol aqueous colloid having a mass concentration of 2%, the mixture was made to be a colloid at a rotation speed of 80 rpm for 75 min, and the hydroxide (D50: 4 μm) of nickel-cobalt-manganese precursor having a molar ratio of Ni:Co:Mn=6:2:2 was added to the colloid at a molar ratio of Li:(Ni+Co+Mn)=1.0:0.95, and a mixed material was obtained at a rotation speed of 2400 rpm for 40 minutes, and the mixed material was put in a muffle furnace and heated at a rate of 18° C./min to 650° C. to be sintered for 5 hours in an oxygen atmosphere, cooled to room temperature, then heated at a rate of 19° C./min to 930° C. to be sintered for 12 hours in an oxygen atmosphere, and cooled to room temperature, and air pre-pulverized in an air pressure of 0.5 Mpa to get a cathode material intermediate A of lithium-nickel-cobalt-manganese-oxygen for stand-by. 0.03 mol of cobalt acetate and 0.02 mol of manganese acetate were added to pure water and the mixture was stirred for 15 min to obtain a solution B containing element cobalt and manganese for stand-by. The solution B was added to the cathode material intermediate A of lithium-nickel-cobalt-manganese-oxygen and the mixture was stirred for 40 min to obtain a mixture C. The mixture C was put in a muffle furnace and heated in an oxygen atmosphere at a heating rate of 18° C./min to 910° C. to be sintered for 5 hours, and cooled to room temperature, and air pulverized at a pressure of 0.5 MPa, and classified by a 300-mesh metal mesh to obtain a lithium ion battery cathode material D2 of spherical or spherical-like layered structure.

The cathode material D2 powder was tested by the X-ray diffraction pattern, and the test results showed that full width at half maximum FWHM (110) of the (110) diffraction peak at diffraction angle 2θ of 64.89 was 0.120, and the structure of the cathode material was a single α-NaFeO$_2$ type layered structure.

Figure 2:
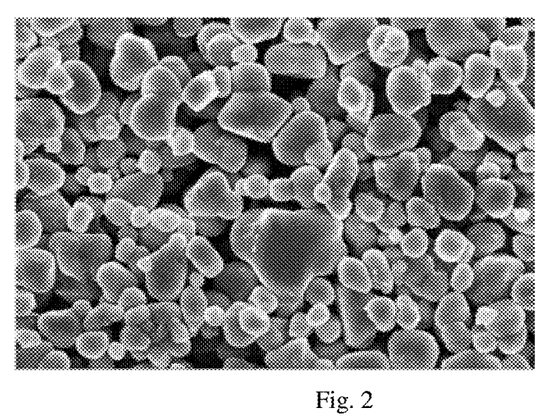
FIG. 2 is a scanning electron micrograph (SEM) of the lithium-ion battery cathode material D2 of a spherical or spherical-like layered structure prepared in Example 2.

The cathode material D2 powder was subjected to a scanning electron microscope test, as shown in FIG. 2. The cathode material D2 powder mainly included the primary particles of morphology of spherical or spherical-like and a small amount of secondary particles agglomerated by primary particles.

The cathode material D2 powder was subjected to particle size and specific surface area tests, the D50 was 3.4 μm, the cumulative percentage of the number of particles having a particle diameter of 5 μm or less was 91.2%, the cumulative percentage of the volume of the particles having a particle diameter of 5 μm or less was 62.3%, and the BET specific surface was 0.78 m$^2$/g.

The corresponding conditions (sintering temperature, sintering time, airflow pulverizing pressure, M source and product) in the sintering step of the cathode material D2 are summarized in Table 1, as shown in Table 1. The index data of the cathode material D2 (the diffraction angle of the (110) plane of the X-ray diffraction, the half-width of the crystal plane, the cumulative percentages of number and the volume basis of the particle size of 5 μm or less; D50 and BET) are summarized in Table 2. The test results of the battery performance preparing by powder D2 as the active material of the cathode material are shown in Table 3.

Example 3

Lithium carbonate, magnesium acetate, yttrium oxide and oxide (D50: 7.5 μm) of nickel-cobalt-manganese precursor having a molar ratio of Ni:Co:Mn=5:2:3 were mixed uniformly at a molar ratio of Li:Mg:Y:(Ni+Co+Mn)=1.2:0.001:0.005:0.994 at a rotation speed of 300 rpm for ball-milling for 50 minutes, and the mixture was put in a muffle furnace and heated at a rate of 18° C./min to 800° C. to be sintered for 30 hours in an air atmosphere, and cooled to room temperature, and air pre-pulverized and classified by a 300-mesh metal mesh to get lithium ion battery cathode material D3 of spherical or spherical-like layered structure.

The cathode material D3 powder was tested by the X-ray diffraction pattern, and the test results showed that full width at half maximum FWHM (110) of the (110) diffraction peak at diffraction angle 2θ of 64.90 was 0.098, and the structure of the cathode material was a single α-NaFeO$_2$ type layered structure.

Figure 3:
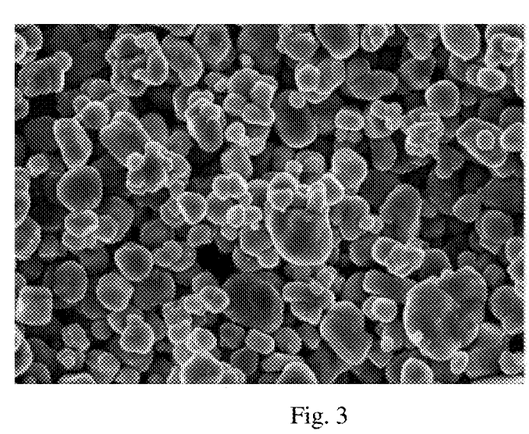
FIG. 3 is a scanning electron microscope (SEM) of the lithium ion battery cathode material D3 of a spherical or spherical-like layered structure prepared in Example 3.

The cathode material D3 powder was subjected to a scanning electron microscope test, as shown in FIG. 3. The cathode material D3 powder mainly included the primary particles of a morphology of spherical or spherical-like and a small amount of secondary particles agglomerated by primary particles.

The cathode material D3 powder was subjected to particle size and specific surface area tests, the D50 was 5.6 μm, the cumulative percentage of the number of particles having a particle diameter of 5 μm or less was 86.15%, the volume cumulative percentage of the particles having a particle diameter of 5 μm or less was 53.2%, and the BET specific surface was 0.58 m$^2$/g.

The corresponding conditions (sintering temperature, sintering time, airflow pulverizing pressure, M source and product) in the sintering step of the cathode material D3 are summarized in Table 1, as shown in Table 1. The index data of the cathode material D3 (the diffraction angle of the (110) plane of the X-ray diffraction, the half-width of the crystal plane, the cumulative percentages of number and the volume basis of the particle size of 5 μm or less; D50 and BET) are summarized in Table 2. The test results of the battery performance preparing by powder D3 as the active material of the cathode material are shown in Table 3.

Example 4

Lithium nitrate, aluminum oxide, tungsten oxide and hydroxide (D50: 10.0 μm) of nickel-cobalt-manganese precursor having a molar ratio of Ni:Co:Mn=1:1:1 were mixed uniformly at a molar ratio of Li:Al:W:(Ni+Co+Mn)=1.16:0.003:0.001:0.996 at a rotation speed of 900 rpm for ball-milling for 20 minutes, and the mixture was put in a muffle furnace and heated at a rate of 15° C./min to 1000° C. to be sintered for 4 hours in an air atmosphere, and cooled to room temperature, and air pre-pulverized at a pressure of 0.2 Mpa and classified by a 300-mesh metal mesh to get lithium ion battery cathode material D4 of spherical or spherical-like layered structure.

Figure 4:
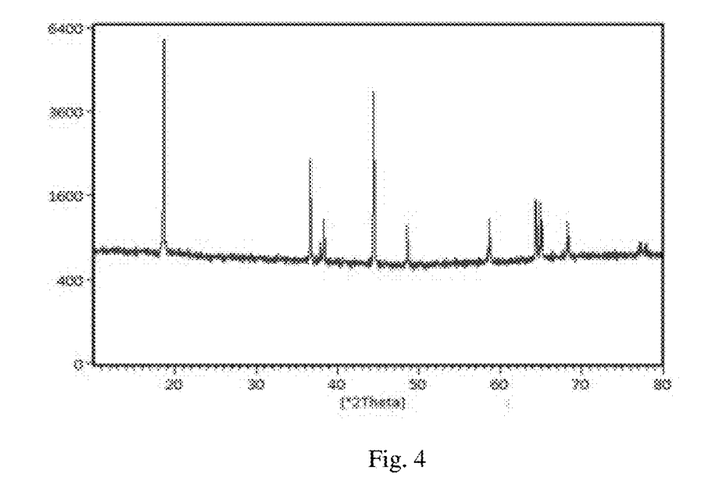
FIG. 4 is a powder X-ray diffraction pattern (XRD) of the lithium ion battery cathode material D4 of a spherical or spherical-like layered structure prepared in Example 4.

The cathode material D4 powder was tested by the X-ray diffraction pattern, as shown in FIG. 4. The test results showed that full width at half maximum FWHM (110) of the (110) diffraction peak at diffraction angle 2θ of 64.88 was 0.110, and the structure of the cathode material was a single α-NaFeO$_2$ type layered structure.

The cathode material D4 powder was subjected to a scanning electron microscope test, the cathode material D4 powder mainly included primary particles of morphology of a spherical or spherical-like and a small amount of secondary particles agglomerated by primary particles.

The cathode material D4 powder was subjected to particle size and specific surface area tests, the D50 was 7.0 μm, the cumulative percentage of the number of particles having a particle diameter of 5 μm or less was 74.2%, the volume cumulative percentage of the particles having a particle diameter of 5 μm or less was 35.5%, and the BET specific surface was 0.40 m$^2$/g.

The corresponding conditions (sintering temperature, sintering time, airflow pulverizing pressure, M source and product) in the sintering step of the cathode material D4 are summarized in Table 1, as shown in Table 1. The index data of the cathode material D4 (the diffraction angle of the (110) plane of the X-ray diffraction, the half-width of the crystal plane, the cumulative percentages of number and the volume basis of the particle size of 5 μm or less; D50 and BET) are summarized in Table 2. The test results of the battery performance preparing by powder D4 as the active material of the cathode material are shown in Table 3.

Example 5

1.05 mol of lithium hydroxide monohydrate was dispersed into 720 ml of mixed aqueous colloid composed of polyethylene glycol having a mass concentration of 3% and acrylamide having a mass concentration of 2%, the mixture was made to be a colloid at a rotation speed of 90 rpm for 50 min, and the hydroxide (D50: 8.5 μm) of nickel-cobalt-manganese precursor having a molar ratio of Ni:Co:Mn=0.9:0.05:0.05 was added to the colloid at a molar ratio of Li:(Ni+Co+Mn)=1.05:0.97, and a mixed material was obtained at a rotation speed of 2800 rpm for 45 minutes, and the mixed material was put in a muffle furnace and heated at a rate of 25° C./min to 400° C. to be sintered for 8 hours in an oxygen atmosphere, and cooled to room temperature, and heated at a rate of 25° C./min to 800° C. to be sintered for 20 hours in an oxygen atmosphere, and cooled to room temperature, and air pre-pulverized in an air pressure of 0.3 Mpa to get a cathode material intermediate A of lithium-nickel-cobalt-manganese-oxygen for stand-by. 0.02 mol of cobalt sulfate and 0.01 mol of nickel sulfate were added to 0.5 mol of pure water and the mixture was stirred for 5 min to obtain a solution B containing elements cobalt and manganese for stand-by. The solution B was added to the cathode material intermediate A of lithium-nickel-cobalt-manganese and the mixture was stirred for 50 min to obtain a mixture C. The mixture C was put in a muffle furnace and heated in an oxygen atmosphere at a heating rate of 25° C./min to 500° C. to be sintered for 10 hours, and cooled to room temperature, and air pulverized at a pressure of 0.1 MPa, and classified by a 300-mesh metal mesh to obtain a lithium ion battery cathode material D5 of spherical or spherical-like layered structure.

The cathode material D5 powder was tested by the X-ray diffraction pattern, and the test results showed that full width at half maximum FWHM (110) of the (110) diffraction peak at diffraction angle 2θ of 64.86 was 0.145, and the structure of the cathode material was a single α-NaFeO$_2$ type layered structure.

The cathode material D5 powder was subjected to a scanning electron microscope test, the cathode material D5 powder was mainly include the primary particles of morphology of a spherical or spherical-like and a small amount of secondary particles agglomerated by primary particles.

The cathode material D5 powder was subjected to particle size and specific surface area tests, the D50 was 6.2 μm, the cumulative percentage of the number of particles having a particle diameter of 5 μm or less was 79.37%, the cumulative percentage of the volume of the particles having a particle diameter of 5 μm or less was 38.7%, and the BET specific surface was 0.62 m$^2$/g.

The corresponding conditions (sintering temperature, sintering time, airflow pulverizing pressure, M source and product) in the sintering step of the cathode material D5 are summarized in Table 1, as shown in Table 1. The index data of the cathode material D5 (the diffraction angle of the (110) plane of the X-ray diffraction, the half-width of the crystal plane, the cumulative percentages of number and the volume basis of the particle size of 5 μm or less; D50 and BET) are summarized in Table 2. The test results of the battery performance preparing by powder D5 as the active material of the cathode material are shown in Table 3.

Example 6

1.1 mol of lithium hydroxide monohydrate was dispersed into 800 ml of mixed aqueous colloid composed of polyethylene glycol having a mass concentration of 1% and an acrylamide having a mass concentration of 4%, the mixture was made to be a colloid at a rotation speed of 100 rpm for 30 min, and the hydroxide (D50: 5.5 μm) of nickel-cobalt-manganese precursor having a molar ratio of Ni:Co:Mn=8:1:1 was added to the colloid at a molar ratio of Li:(Ni+Co+Mn)=1.1:0.998, and a mixed material was obtained at a rotation speed of 3000 rpm for 50 minutes, and the mixed material was put in a muffle furnace and heated at a rate of 22° C./min to 550° C. to be sintered for 6 hours in an oxygen atmosphere, and cooled to room temperature, and heated at a rate of 22° C./min to 880° C. to be sintered for 16 hours in an oxygen atmosphere, and cooled to room temperature, and air pre-pulverize in an air pressure of 0.4 Mpa to get cathode material intermediate A of lithium-nickel-cobalt-manganese-oxygen for stand-by. 0.002 mol of tetrabutyl zirconate was added to 0.3 mol of isopropanol and the mixture was stirred for 30 min to obtain a solution B containing element zirconium for stand-by. The solution B was added to the cathode material intermediate A of lithium-nickel-cobalt-manganese and the mixture was stirred for 60 min to obtain a mixture C. The mixture C was put in a muffle furnace and heated in an oxygen atmosphere at a heating rate of 22° C./min to 850° C. to be sintered for 6 hours, and cooled to room temperature, and air pulverized at a pressure of 0.4 MPa, and classified by a 300-mesh metal mesh to obtain a lithium ion battery cathode material D6 of spherical or spherical-like layered structure.

The cathode material D6 powder was tested by the X-ray diffraction pattern, and the test results showed that full width at half maximum FWHM (110) of the (110) diffraction peak at diffraction angle 2θ of 64.95 was 0.082, and the structure of the cathode material was a single α-NaFeO$_2$ type layered structure.

The cathode material D6 powder was subjected to a scanning electron microscope test, the cathode material D6 powder was mainly include the primary particles of morphology of a spherical or spherical-like and a small amount of secondary particles agglomerated by primary particles.

The cathode material D6 powder was subjected to particle size and specific surface area tests, the D50 was 4.0 μm, the cumulative percentage of the number of particles having a particle diameter of 5 μm or less was 88.5%, the cumulative percentage of the volume of the particles having a particle diameter of 5 μm or less was 57.5%, and the BET specific surface was 0.71 m$^2$/g.

The corresponding conditions (sintering temperature, sintering time, airflow pulverizing pressure, M source and product) in the sintering step of the cathode material D6 are summarized in Table 1, as shown in Table 1. The index data of the cathode material D6 (the diffraction angle of the (110) plane of the X-ray diffraction, the half-width of the crystal plane, the cumulative percentages of number and the volume basis of the particle size of 5 μm or less; D50 and BET) are summarized in Table 2. The test results of the battery performance preparing by powder D6 as the active material of the cathode material are shown in Table 3.

Example 7

Lithium acetate, magnesium oxide, and carboxyl oxide (D50: 12.0 μm) of nickel-cobalt-manganese precursor having a molar ratio of Ni:Co:Mn=4:3:3 were mixed uniformly at a molar ratio of Li:Mg:(Ni+Co+Mn)=1.15:0.003:0.997 at a rotation speed of 700 rpm for ball-milling for 25 minutes, and the mixture was put in a muffle furnace and heated at a rate of 20° C./min to 900° C. to be sintered for 20 hours in an air atmosphere, and cooled to room temperature, and air pre-pulverized at a pressure of 0.6 Mpa and classified by a 300-mesh metal mesh to get lithium ion battery cathode material D7 of spherical or spherical-like layered structure.

The cathode material D7 powder was tested by the X-ray diffraction pattern, and the test results showed that full width at half maximum FWHM (110) of the (110) diffraction peak at diffraction angle 2θ of 64.93 was 0.130, and the structure of the cathode material was a single α-NaFeO$_2$ type layered structure.

The cathode material D7 powder was subjected to a scanning electron microscope test, the cathode material D4 powder was mainly include the primary particles of morphology of a spherical or spherical-like and a small amount of secondary particles agglomerated by primary particles.

The cathode material D7 powder was subjected to particle size and specific surface area tests, the D50 was 8.0 μm, the cumulative percentage of the number of particles having a particle diameter of 5 μm or less was 68.5%, the cumulative percentage of the volume of the particles having a particle diameter of 5 μm or less was 28.3%, and the BET specific surface was 0.30 m$^2$/g.

The corresponding conditions (sintering temperature, sintering time, airflow pulverizing pressure, M source and product) in the sintering step of the cathode material D7 are summarized in Table 1, as shown in Table 1. The index data of the cathode material D7 (the diffraction angle of the (110) plane of the X-ray diffraction, the half-width of the crystal plane, the cumulative percentages of number and volume basis of the particle size of 5 μm or less; D50 and BET) are summarized in Table 2. The test results of the battery performance preparing by powder D7 as the active material of the cathode material are shown in Table 3.

Comparative Example 1

The same process as the preparation method of Example 3 was adopted, which the M source was not added for comparison.

Lithium carbonate and oxide (D50: 7.5 μm) of nickel-cobalt-manganese precursor having a molar ratio of Ni:Co:Mn=5:2:3 were mixed uniformly at a molar ratio of Li:(Ni+Co+Mn)=1.2:1 at a rotation speed of 300 rpm for ball-milling for 50 minutes, and the mixture was put in a muffle furnace and heated at a rate of 25° C./min to 800° C. to be sintered for 30 hours in an air atmosphere, and cooled to room temperature, and air pulverized at an air pressure of 0.8 Mpa and classified by a 300-mesh metal mesh to get lithium ion battery cathode material E1 of spherical or spherical-like layered structure.

Figure 5A:
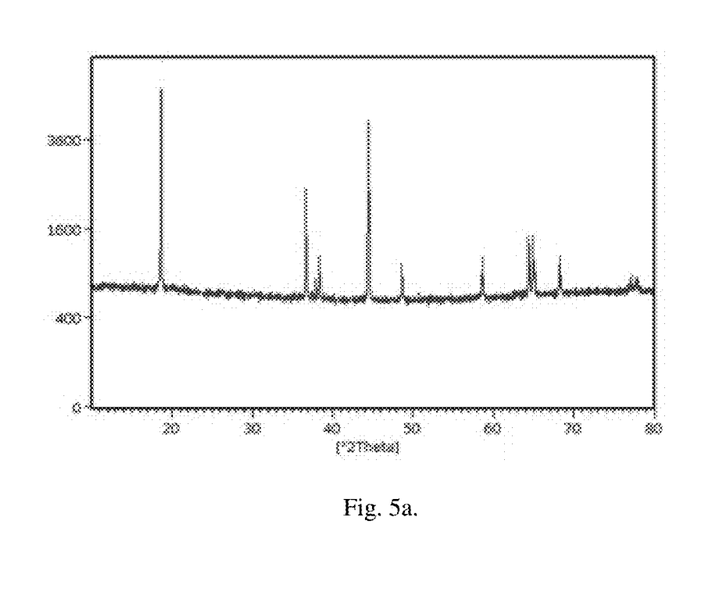
FIG. 5a. is a powder X-ray diffraction pattern (XRD) of Comparative Example 1.

The cathode material E1 powder was tested by the X-ray diffraction pattern, as shown in FIG. 5a. The test results showed that full width at half maximum FWHM (110) of the (110) diffraction peak at diffraction angle 2θ of 64.87 was 0.070, and the structure of the cathode material was a single α-NaFeO$_2$ type layered structure.

Figure 5B:
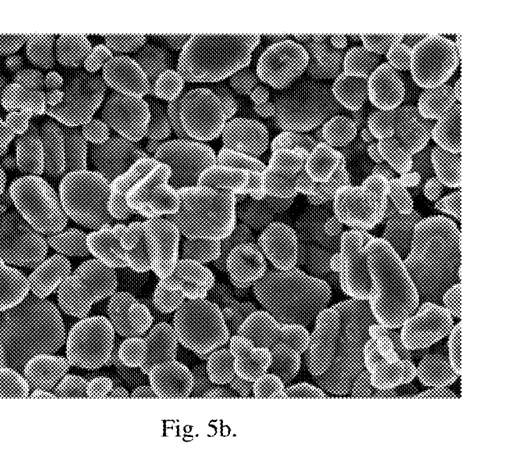
FIG. 5b. is a scanning electron micrograph (SEM) of Comparative Example 1.

The cathode material E1 powder was subjected to a scanning electron microscope test, as shown in FIG. 5b. The cathode material E3 powder mainly included the primary particles of morphology of spherical or spherical-like and a small amount of secondary particles agglomerated by primary particles.

The cathode material E1 powder was subjected to particle size and specific surface area tests, the D50 was 5.8 μm, the cumulative percentage of the number of particles having a particle diameter of 5 μm or less was 81.63%, the cumulative percentage of the volume of the particles having a particle diameter of 5 μm or less was 49.8%, and the BET specific surface was 0.56 m$^2$/g.

The corresponding conditions (sintering temperature, sintering time, airflow pulverizing pressure, M source and product) in the sintering step of the cathode material E1 are summarized in Table 1, as shown in Table 1. The index data of the cathode material E1 (the diffraction angle of the (110) plane of the X-ray diffraction, the half-width of the crystal plane, the cumulative percentages of number and the volume basis of the particle size of 5 μm or less; D50 and BET) are summarized in Table 2. The test results of the battery performance preparing by powder E1 as the active material of the cathode material are shown in Table 3.

Comparative Example 2

The same process as the preparation method of Example 1 was adopted, which the amount of M source was different for comparison.

1.04 mol of lithium hydroxide monohydrate was dispersed into 600 ml of acrylamide aqueous colloid having a mass concentration of 5%, the mixture was made to be a colloid at a rotation speed of 55 rpm for 90 min, and the carboxyl oxide (D50: 3 μm) of nickel-cobalt-manganese precursor having a molar ratio of Ni:Co:Mn=5:2:3 was added to the colloid at a molar ratio of Li:(Ni+Co+Mn)=1.04:0.94, and a mixed material was obtained at a rotation speed of 2000 rpm for 30 minutes, and the mixed material was put in a muffle furnace and heated at a rate of 15° C./min to 800° C. to be pre-sintered for 4 hours in an air atmosphere, and cooled to room temperature, and heated at a rate of 17° C./min to 980° C. to be sintered for 8 hours in an air atmosphere, cooled to room temperature, air pre-pulverized in an air pressure of 1.0 Mpa to get cathode material intermediate A of lithium-nickel-cobalt-manganese-oxygen for stand-by. 0.06 mol of tetrabutyl titanate was added to 0.2 mol of isopropanol and the mixture was stirred for 10 min to obtain a solution B containing element titanium for stand-by. The organic solution B was added to the cathode material intermediate A of lithium-nickel-cobalt-manganese and the mixture was stirred for 30 min to obtain a mixture C, the mixture C was put in a muffle furnace and heated in an air atmosphere at a heating rate of 25° C./min to 500° C. to be sintered for 10 hours, and cooled to room temperature, and air pulverized at a pressure of 0.1 Mpa, and classified by a 300-mesh metal mesh to obtain a lithium ion battery cathode material E2 of spherical or spherical-like layered structure.

Figure 6A:
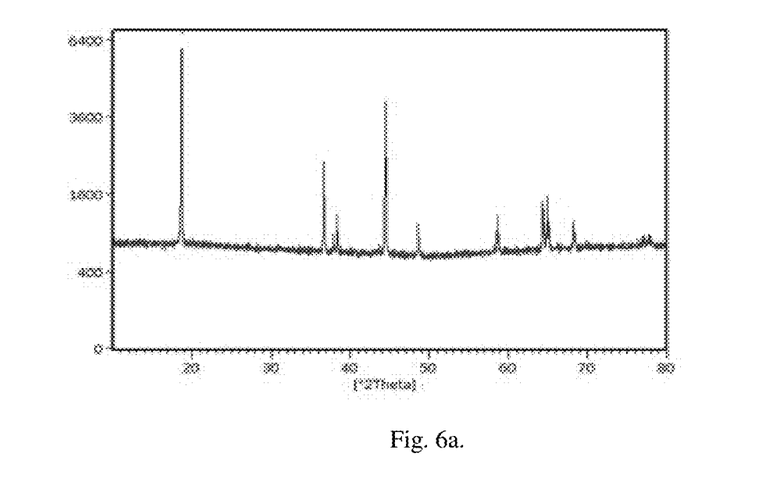
FIG. 6a. is a powder X-ray diffraction pattern (XRD) of Comparative Example 2.

The cathode material E2 powder was tested by the X-ray diffraction pattern, as shown in FIG. 6a. The test results showed that full width at half maximum FWHM (110) of the (110) diffraction peak at diffraction angle 2θ of 64.96 was 0.150, the structure of the cathode material and was a single α-NaFeO$_2$ type layered structure.

Figure 6B:
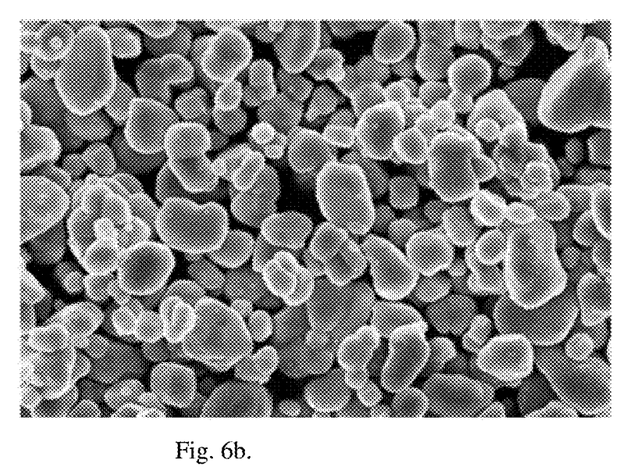
FIG. 6b. is a scanning electron micrograph (SEM) of Comparative Example 2.
Figure 7:
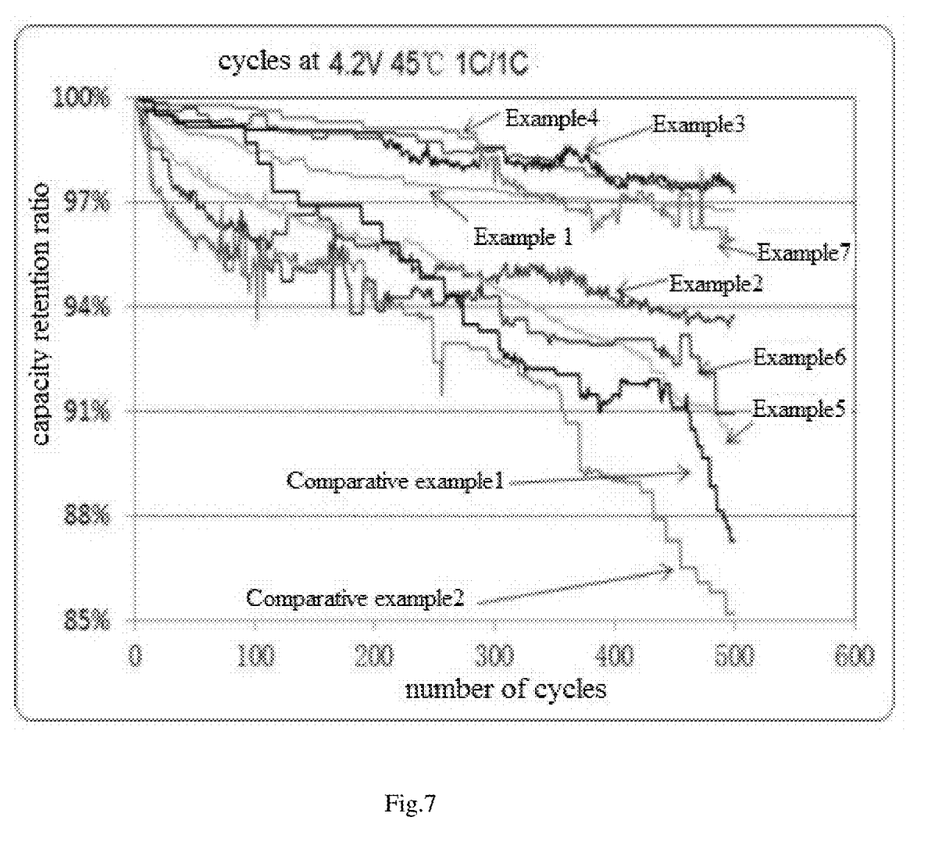
FIG. 7 is a comparison chart of all Examples and Comparative Examples at 4.2 V, 45C, 1.0C/1.0° C. after 500 cycles.
Figure 8:
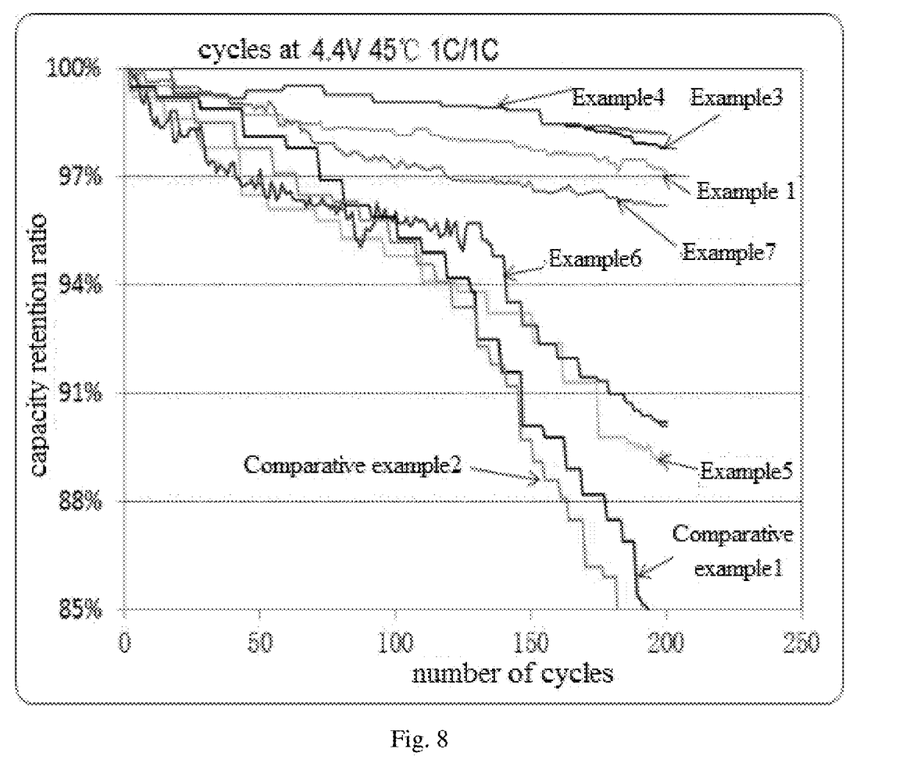
FIG. 8 is a comparison chart of all Examples and Comparative Examples at 4.4 V, 45C, 1.0° C./1.0C after 200 cycles.

The cathode material E2 powder was subjected to a scanning electron microscope test, as shown in FIG. 6b, the cathode material E2 powder was mainly include the primary particles of a morphology of spherical or spherical-like and a small amount of secondary particles agglomerated by primary particles.

The cathode material E2 powder was subjected to particle size and specific surface area tests, the D50 was 3.2 μm, the cumulative percentage of the number of particles having a particle diameter of 5 μm or less was 92.3%, the cumulative percentage of the volume of the particles having a particle diameter of 5 μm or less was 62.8%, and the BET specific area was 0.87 m$^2$/g.

The corresponding conditions (sintering temperature, sintering time, airflow pulverizing pressure, M source and product) in the sintering step of the cathode material E2 are summarized in Table 1, as shown in Table 1. The index data of the cathode material E2 (the diffraction angle of the (110) plane of the X-ray diffraction, the half-width of the crystal plane, the cumulative percentages of number and the volume basis of the particle size of 5 μm or less; D50 and BET) are summarized in Table 2, The test results of the battery performance preparing by powder E2 as the active material of the cathode material are shown in Table 3.

TABLE 1

| Examples | M source | amount of M source | heating rate ° C./min | pre-sintering temperature ° C. | pre-sintering time h | atmosphere | heating rate ° C./min | sintering temperature ° C. | sintering time h | method of pre-pulverizing |
|---|---|---|---|---|---|---|---|---|---|---|
| Example 1 | Ti | 0.002 | 15 | 800 | 4 | air | 17 | 980 | 8 | air pulverzing |
| Example 2 | Co/Mn | 0.03/0.02 | 18 | 650 | 5 | oxygen gas | 19 | 930 | 12 | air pulverzing |
| Example 3 | Y/Mg | 0.001/0.005 | / | / | / | air | 18 | 800 | 30 | / |
| Example 4 | Al/W | 0.003/0.001 | / | / | / | air | 15 | 1000 | 4 | / |
| Example 5 | Co/Ni | 0.02/0.01 | 25 | 400 | 8 | Oxygen gas | 25 | 800 | 20 | air pulverzing |
| Example 6 | Zr | 0.002 | 22 | 550 | 6 | oxygen gas | 22 | 880 | 16 | air pulverzing |
| Example 7 | Mg | 0.003 | / | / | / | air | 20 | 900 | 20 | / |
| Comparative Example 1 | / | / | / | / | / | air | 25 | 800 | 30 | / |

TABLE 1-continued

| | | | | | | | | | | |
|---|---|---|---|---|---|---|---|---|---|---|
| Comparative Example 2 | Ti | 0.06 | 15 | 800 | 4 | air | 17 | 980 | 8 | air pulverzing |

| Examples | pressure of pre-pulverizing Mpa | post-sintering atmoshphere | heating rate °C./min | post-sintering temperature °C. | post-sintering time h | pulverizing method | pressure of pulverizing Mpa | product |
|---|---|---|---|---|---|---|---|---|
| Example 1 | 1.0 | air | 15 | 960 | 4 | air pulverzing | 0.7 | D1 |
| Example 2 | 0.5 | oxygen gas | 18 | 910 | 5 | air pulverzing | 0.5 | D2 |
| Example 3 | / | / | / | / | / | air pulverzing | 0.8 | D3 |
| Example 4 | / | / | / | / | / | air pulverzing | 0.2 | D4 |
| Example 5 | 0.3 | oxygen gas | 25 | 500 | 10 | air pulverzing | 0.1 | D5 |
| Example 6 | 0.4 | oxygen gas | 22 | 850 | 6 | air pulverzing | 0.4 | D6 |
| Example 7 | / | / | / | / | / | air pulverzing | 0.6 | D7 |
| Comparative Example 1 | / | / | / | / | / | air pulverzing | 0.8 | E1 |
| Comparative Example 2 | 1.0 | air | 25 | 500 | 10 | air pulverzing | 0.1 | E2 |

TABLE 2

| Examples | 2E | half-width 110 | cumulative percentage of the number of particles having a particle diameter of 5 µm or less % | cumulative percentage of the volume of particles having a particle diameter of 5 µm or less % | D50 µl | BET m²/g |
|---|---|---|---|---|---|---|
| Example 1 | 64.92 | 0.073 | 94.4 | 63.5 | 3.0 | 0.90 |
| Example 2 | 64.89 | 0.120 | 91.2 | 62.3 | 3.4 | 0.78 |
| Example 3 | 64.90 | 0.098 | 86.2 | 53.2 | 5.6 | 0.58 |
| Example 4 | 64.88 | 0.110 | 74.2 | 35.5 | 7.0 | 0.40 |
| Example 5 | 64.86 | 0.145 | 79.4 | 38.7 | 6.2 | 0.62 |
| Example 6 | 64.95 | 0.082 | 88.5 | 57.5 | 4.0 | 0.71 |
| Example 7 | 64.93 | 0.130 | 68.5 | 28.3 | 8.0 | 0.30 |
| Comparative Example 1 | 64.87 | 0.070 | 81.6 | 49.8 | 5.8 | 0.56 |
| Comparative Example 2 | 64.96 | 0.150 | 92.3 | 62.8 | 3.2 | 0.87 |

TABLE 3

| | CR2430 | | 454261 | | 454261 capacity retention ratio of 500 cycles at 4.2 V 45° C. 1.0 C (%) | capacity retention ratio of 200 cycles at 4.4 V 45° C. 1.0 C (%) |
|---|---|---|---|---|---|---|
| Example | Capacity at 4.2-3.0 V 0.1 C (mAh/g) | Capacity at 4.35-3.0 V 0.1 C (mAh/g) | Capacity at 4.2-3.0 V 1.0 C (mAh/g) | Capacity at 4.35-3.0 V 1.0 C (mAh/g) | | |
| Example 1 | 152 | 170 | 150 | 169 | 96.8 | 97.1 |
| Example 2 | 162 | 175 | 162 | 172 | 93.5 | 90.2 |
| Example 3 | 151 | 168 | 149 | 168 | 97.3 | 97.8 |
| Example 4 | 149 | 158 | 147 | 160 | 97.5 | 98.2 |
| Example 5 | 194 | 208 | 186 | 202 | 90.2 | 89.5 |
| Example 6 | 183 | 199 | 179 | 193 | 90.8 | 90.1 |

TABLE 3-continued

| Example | CR2430 Capacity at 4.2-3.0 V 0.1 C (mAh/g) | CR2430 Capacity at 4.35-3.0 V 0.1 C (mAh/g) | 454261 Capacity at 4.2-3.0 V 1.0 C (mAh/g) | 454261 Capacity at 4.35-3.0 V 1.0 C (mAh/g) | 454261 capacity retention ratio of 500 cycles at 4.2 V 45° C. 1.0 C (%) | 454261 capacity retention ratio of 200 cycles at 4.4 V 45° C. 1.0 C (%) |
|---|---|---|---|---|---|---|
| Example 7 | 151 | 165 | 150 | 163 | 95.8 | 96.2 |
| Comparative Example 1 | 144 | 152 | 146 | 158 | 87.3 | 84.6 |
| Comparative Example 2 | 132 | 143 | 136 | 151 | 85.2 | 80.7 |

According to the above mentioned Examples of the present invention, it can be seen that the cumulative percentage of the number of particles having a particle size of 5 μm or less was between 68.5 and 94.4% of the lithium ion battery cathode material of spherical or spherical-like layered structure based on primary particles prepared by the invention, that is to say more than 60%, and the cumulative percentage of the volume of the particles having a particle diameter of 5 μm or less is usually larger than 25% in the volume particle of primary particles and secondary particles agglomerated by the primary particles of the cathode material, and is in the range of 28.3 to 63.5%. After 200 cycles at 4.4V, 45° C., 1.0C, the capacity retention ratio of the batteries prepared by the cathode material was more than 90%, the maximum capacity retention ratio was even up to 98.2%. After 500 cycles at 4.2V, 45° C., 1.0C, the capacity retention ratio of the batteries prepared by the cathode material was more than 90%, the maximum capacity retention ratio was even up to 97.5%; the case of secondary aggregated particles fragmentation in the process of circulation can be effectively avoided. The material has excellent cycling performance and safety performance under high temperature and high voltage, and is suitable for digital product, electric vehicles, electric bicycles, fast charge bus, passenger cars, communications, electricity, energy storage systems.

The invention claimed is:

1. A lithium ion battery cathode material of a spherical layered structure is characterized in that a chemical formula of said cathode material is $Li_aNi_xCo_yMn_zM_bO_2$, wherein $1.0 \leq a \leq 1.2$; $0.002 < b \leq 0.05$; $0.30 \leq x \leq 0.90$; $0.05 \leq y \leq 0.40$; $0.05 \leq z \leq 0.50$; $x+y+z+b=1$; M is one or two or more of Mg, Ti, Al, Zr, Y, Co, Mn, Ni, Ba and a rare earth element.

2. The lithium ion battery cathode material of a spherical layered structure according to claim 1 is characterized in that a doping amount b of the doping element M is 0.001 to 0.05.

3. The lithium ion battery cathode material of a spherical layered structure according to claim 2 is characterized in that said cathode material powder comprises primary particles of a morphology of spherical shape and a small amount of secondary particles agglomerated by primary particles under scanning electron microscope (SEM), wherein cumulative percentage of the number of particles having a particle diameter of 5 μm or less is generally greater than 60% in the number-basis sizes of primary particles and secondary particles agglomerated by primary particles of the cathode material.

4. The lithium ion battery cathode material of a spherical layered structure according to claim 2 is characterized in that a single α-NaFeO$_2$ type layered structure of said cathode material is shown by a powder X-ray diffraction pattern (XRD), and full width at half maximum FWHM (110) of the (110) diffraction peak near a diffraction angle 2θ of 64.9° is 0.073 to 0.145.

5. The lithium ion battery cathode material of a spherical layered structure according to any one of claim 3 is characterized in that specific surface area of said cathode material measured by BET method is 0.3 to 0.9 m²/g.

6. The lithium ion battery cathode material of a spherical layered structure according to any one of claim 4 is characterized in that specific surface area of said cathode material measured by BET method is 0.3 to 0.9 m²/g.

7. The lithium ion battery cathode material of a spherical layered structure according to claim 3 is characterized in that a median particle diameter of said cathode material is 3.0 to 8.0 μm.

8. The lithium ion battery cathode material of a spherical layered structure according to claim 4 is characterized in that a median particle diameter of said cathode material is 3.0 to 8.0 μm.

9. A lithium ion battery is characterized by comprising the cathode material of claim 3 as a positive electrode active material.

10. The lithium ion battery according to claim 9 is characterized in that a single α-NaFeO$_2$ type layered structure of said cathode material is shown by a powder X-ray diffraction spectrum (XRD), and full width at half maximum FWHM (110) of the (110) diffraction peak near a diffraction angle 2θ of 64.9° is 0.073 to 0.145.

11. An energy storage system is characterized in that it is prepared by using the lithium ion battery of claim 9.

12. The energy storage system according to claim 11 is characterized in that a single α-NaFeO$_2$ type layered structure of said cathode material is shown by a powder X-ray diffraction pattern (XRD), and full width at half maximum FWHM (110) of the (110) diffraction peak near a diffraction angle 2θ of 64.9° is 0.073 to 0.145.

13. A mobile storage device is characterized in that it is prepared by using the lithium ion battery of claim 9.

* * * * *